(12) United States Patent
Lin

(10) Patent No.: US 7,226,024 B2
(45) Date of Patent: Jun. 5, 2007

(54) MAGNETIC ALTITUDE ADJUSTING MECHANISM

(75) Inventor: Huan-Tsung Lin, Hsinchu (TW)

(73) Assignee: Nano Precision Corp. (TW)

( * ) Notice: Subject to any disclaimer, the term of this patent is extended or adjusted under 35 U.S.C. 154(b) by 45 days.

(21) Appl. No.: 11/269,762

(22) Filed: Nov. 9, 2005

(65) Prior Publication Data

US 2006/0169852 A1  Aug. 3, 2006

(30) Foreign Application Priority Data

Jan. 18, 2005  (TW) .............................. 94101456 A

(51) Int. Cl.
*A47F 5/00* (2006.01)
(52) U.S. Cl. ................. 248/125.8; 248/414; 248/354.1
(58) Field of Classification Search ............. 248/125.1, 248/125.8, 125.2, 161, 162.1, 404, 414, 157, 248/188.5, 354.1
See application file for complete search history.

(56) References Cited

U.S. PATENT DOCUMENTS

| | | | | |
|---|---|---|---|---|
| 4,830,321 A | * | 5/1989 | Irie | .......................... 248/206.5 |
| 5,884,736 A | * | 3/1999 | Burdisso et al. | ............. 188/379 |
| 2002/0109052 A1 | * | 8/2002 | Jeon et al. | ................... 248/161 |
| 2002/0162921 A1 | * | 11/2002 | Rotondi | .................... 248/125.8 |

* cited by examiner

*Primary Examiner*—Ramon O Ramirez
(74) *Attorney, Agent, or Firm*—Lowe Hauptman & Berner, LLP

(57) ABSTRACT

A magnetic altitude adjusting mechanism is described. The magnetic altitude adjusting mechanism includes a slide, a track, and a magnetic repulsive device. The slide including a magnetic piece is bar-shaped. The magnetic piece is configured in the slide. A longitudinal direction of the magnetic piece and a longitudinal direction of the slide are the same. The slide is coupled to the track so as to move along the track and be prevented from rotation thereon. The magnetic repulsive device is disposed on one end of the track to generate a magnetic repulsive force for fixing the slide on the track. The slide stops on a predetermined position with the magnetic repulsive force while an external force is released after the slide is adjusted to the predetermined position by the external force.

13 Claims, 5 Drawing Sheets

MAGNETIC ALTITUDE ADJUSTING MECHANISM

RELATED APPLICATIONS

The present application is based on, and claims priority from, Taiwan Application Serial Number 94101456, filed Jan. 18, 2005, the disclosure of which is hereby incorporated by reference herein in its entirety.

BACKGROUND OF THE INVENTION

1. Field of Invention

The invention relates to an altitude adjusting mechanism and, in particular, to a magnetic altitude adjusting mechanism.

2. Related Art

As shown in FIG. 1, the conventional altitude adjusting device of a thin display device is comprised of a slide 100', a track 200', a coil spring 300' and a base 500'. The thin display device is installed on a coupling portion 120' of the slide 100'. The user imposes a force on the thin display device to adjust its altitude. After the external force is removed, the weight of the thin display device and the slide 100' is equal to the sum of a spring force of the coil spring 300' and a frictional force between the slide 100' and a sliding piece 210' on the track 200'. Therefore, the slide 100' can stop at any position on the track 200'. The weight of the thin display device is invariant. However, the frictional force between the slide 100' and the sliding piece 210' on the track 200' and the spring force of the coil spring 300' vary with time, adjusting frequency, temperature, and climate. Once the coil spring 300' reaches its elastic fatigue, or the friction between the slide 100' and the sliding piece 210' changes, it is difficult to achieve a balance in force to maintain the altitude of the thin display device. Moreover, the replacement of the coil spring 300' is time-consuming and inconvenient.

SUMMARY OF THE INVENTION

An object of the invention is to provide a magnetic altitude adjusting mechanism that uses a magnetic repulsive force in place of the spring force of a coil spring to achieve the stepless altitude adjustment.

Another object of the invention is to provide a magnetic altitude adjusting mechanism that can adjust the altitude of devices of different weights by simply adjusting the magnetic repulsive force.

A further object of the invention is to provide a magnetic altitude adjusting mechanism with a structure that is easy to disassemble. In accord with the above objects, the disclosed magnetic altitude adjusting mechanism includes a slide, a track, and a magnetic repulsive mechanism. The slide containing a magnetic piece assumes a bar shape. The magnetic piece is configured in the slide. A longitudinal direction of the magnetic piece and a longitudinal direction of the slide are the same. The slide couples to the track so as to move along the track and is forbidden to rotate thereon. The magnetic repulsive device is disposed on the track to generate a magnetic repulsive force for fixing the slide on the track. The magnetic repulsive mechanism includes a fixing base and an arm set. The fixing base fixes the track from both sides and contains a fulcrum and an angle-adjusting groove. The arm set is coupled to the fulcrum by its central portion and wiggles about the fulcrum. The arm includes a magnetic object and a fixing device. The magnetic object is disposed on one side of the arm set, magnetically repulsive to the magnetic piece. The fixing device is disposed on the other side of the arm set. The fixing device is coupled to the angle-adjusting groove. The orientation of the arm set is determined by the coupling position of the fixing device to the angle-adjusting groove. The magnetic repulsive force between the magnetic object and the magnetic piece is adjusted accordingly.

When an external force is imposed on the slide, it slides along the track. Once the external force is released after the slide is adjusted to a desired altitude, the repulsive force between the magnetic object and the magnetic piece fixes the slide at a predetermined position.

BRIEF DESCRIPTION OF THE DRAWINGS

These and other features, aspects and advantages of the invention become apparent by reference to the following description and accompanying drawings which are given by way of illustration only, and thus are not limitative of the invention, and wherein.

DETAILED DESCRIPTION OF THE PREFERRED EMBODIMENT

The present invention is apparent from the following detailed description, which proceeds with reference to the accompanying drawings, wherein the same references relate to the same elements.

Figure 1:
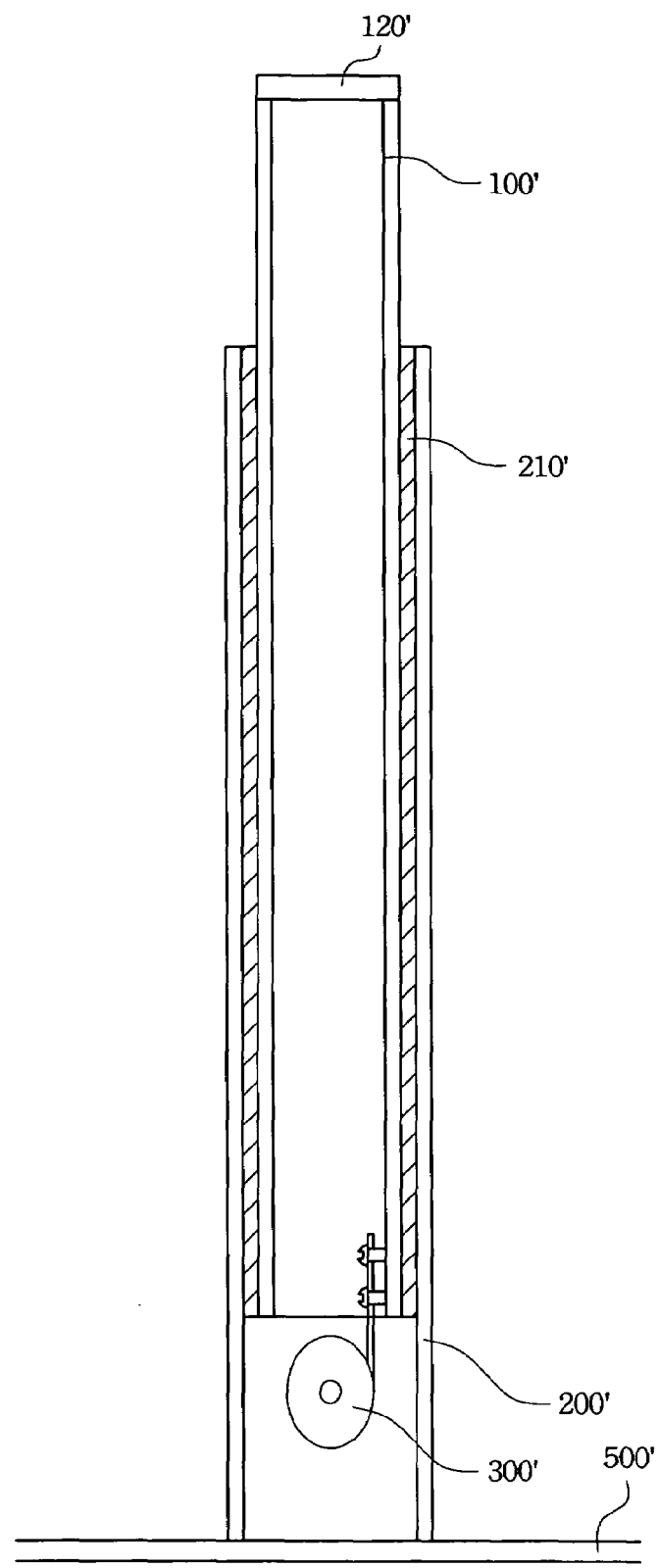
FIG. 1 is a schematic view of a conventional stepless altitude adjusting mechanism.
Figure 2:
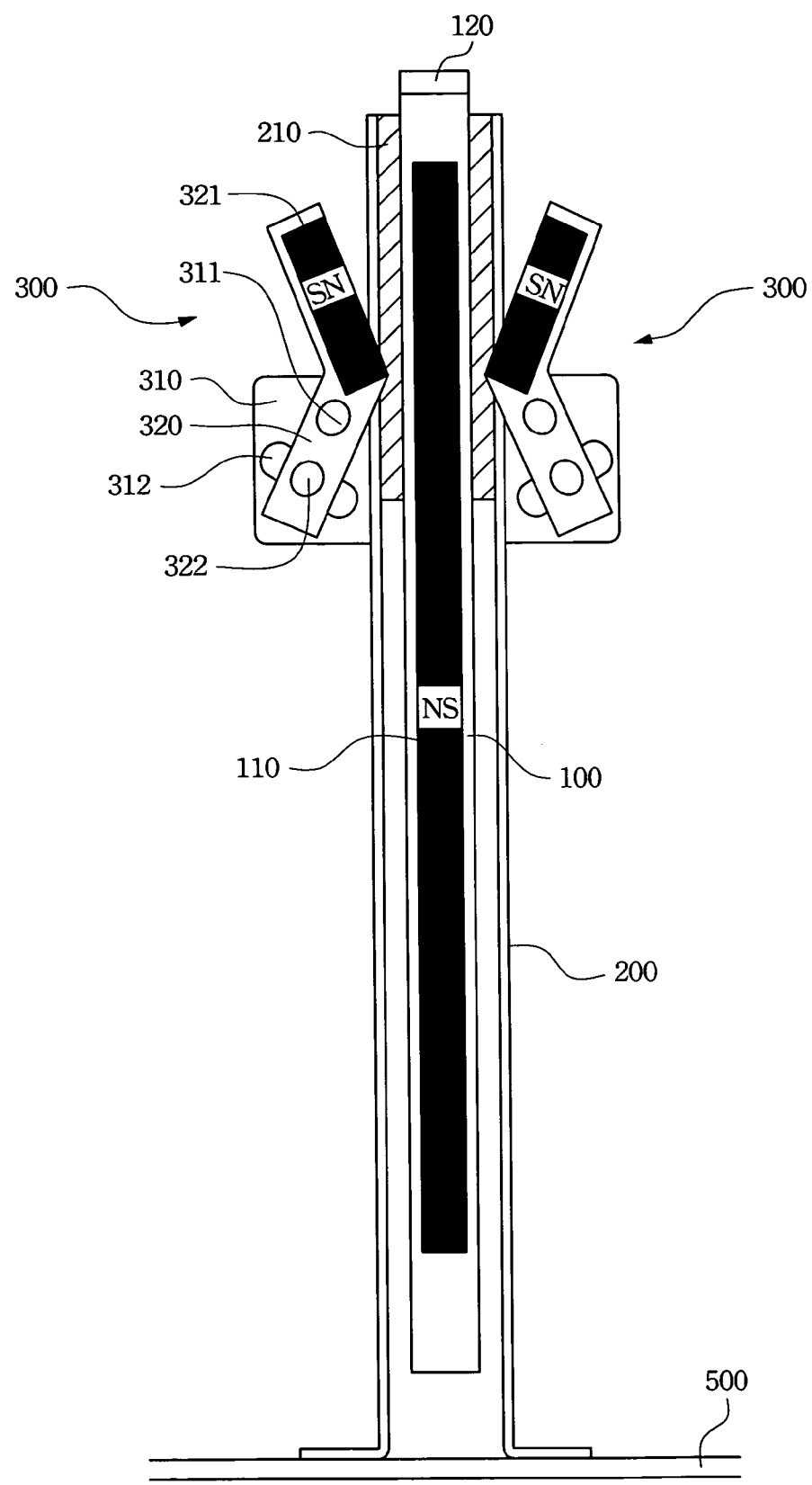
FIG. 2 is a schematic side view of the disclosed magnetic altitude adjusting mechanism.

As shown in FIG. 2, the magnetic altitude adjusting mechanism includes a slide 100, a track 200, and a magnetic repulsive mechanism 300.

Figure 3:
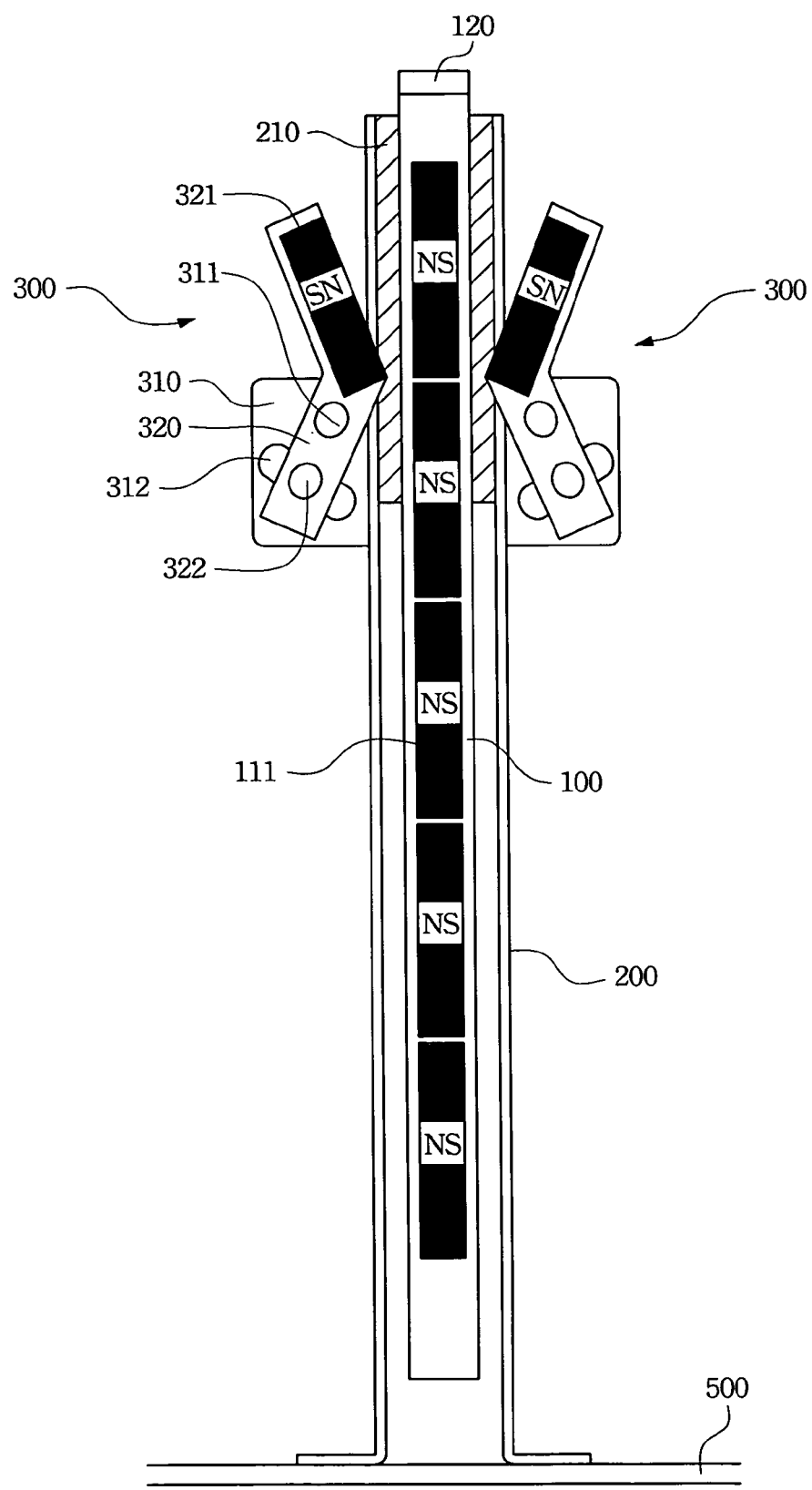
FIG. 3 is a schematic view showing a magnetic piece composed of several smaller magnetic objects.

The slide 100 contains a magnetic piece 110 and has a bar shape. The magnetic piece 110 is configured in a longitudinal direction as the same direction of the slide 100. The magnetic piece 110 shown in FIG. 2 is a stepless strip. However, the magnetic piece 110 may include several magnetic objects 111 disposed in a line, as shown in FIG. 3.

The slide 100 contains a device-coupling base 120 on the slide 100 for coupling with a device, such as a thin display device. The device uses the magnetic altitude adjusting mechanism to adjust the altitude of it.

The track 200 is coupled to the slide 100 so that the slide 100 only moves along the track 200 without rotation thereon. The track 200 includes a sliding piece 210 between the track 200 and the slide 100 for the slide 100 to move smoothly thereon.

The magnetic repulsive mechanism 300 is disposed on one end of the track 200 and includes a fixing base 310 and an arm set 320. The fixing base 310 fixes the track 200 from both sides and includes a fulcrum 311 and an angle-adjusting groove 312. The arm 320 is of a V shape, and a bending portion of the V shape (i.e. the central portion) is coupled to the fulcrum 311. The V shape structure oscillates about the fulcrum 311. The arm 320 contains a magnetic object 321 and a fixing device 322. The magnetic object 321 is disposed on one end of the arm 320 and is magnetically repulsive to the magnetic piece 110. The fixing device 322 is disposed on the other end of the arm 320, coupling to the angle-adjusting groove 312. The orientation of the arm 320 is determined by the position that the fixing device 322 is coupled to the angle-adjusting groove 312. The magnetic repulsive force between the magnetic object 321 and the magnetic piece 110 is adjusted accordingly.

The magnetic altitude adjusting mechanism includes a base 500 coupled to a bottom of the track 200 to increase the stability thereof as the magnetic altitude adjusting mechanism stands.

When an external force is imposed to adjust the altitude of the slide 100, the slide 100 slides along the track 200. After the external force is removed, the magnetic repulsive force between the magnetic object 321 and the magnetic piece 110 stops the slide 100 at a predetermined position.

Figure 4A:
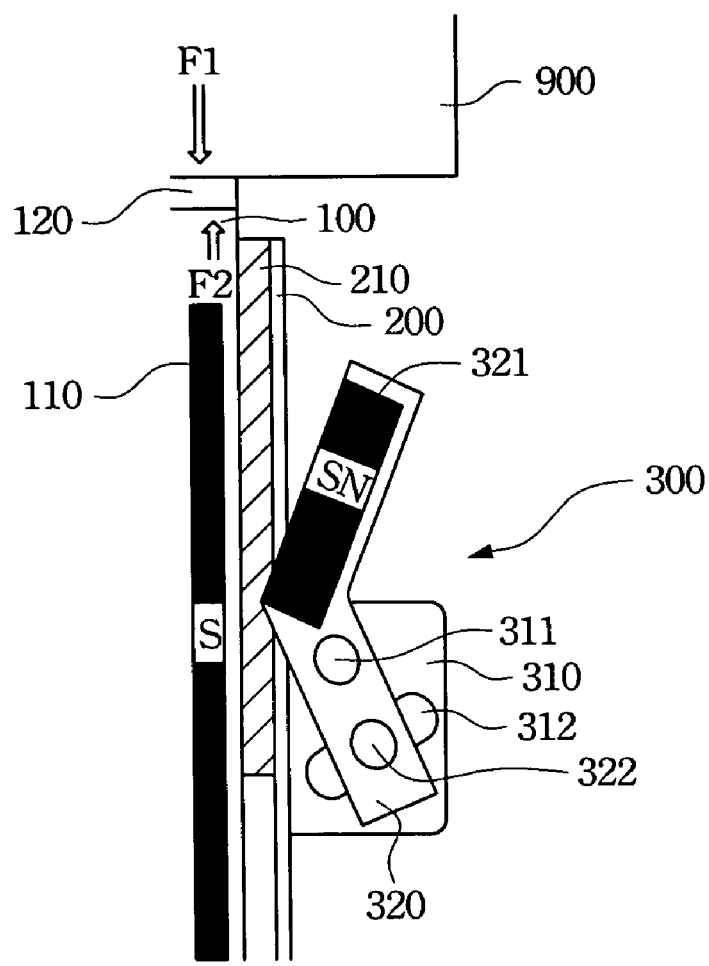
FIG. 4A is a schematic view showing the directions of forces imposed on downward moving device and slide.

In the following, refer to drawings for a detailed description of the invention. As shown in FIG. 4A, when a device 900 such as the thin display device is installed on the coupling base 120, the slide 100 and the device 900 moves downwards due to the weight F1. An upward friction F2 is thus produced between the slide 100 and the sliding piece 210 on the track 200 during the sliding downward.

Figure 4B:
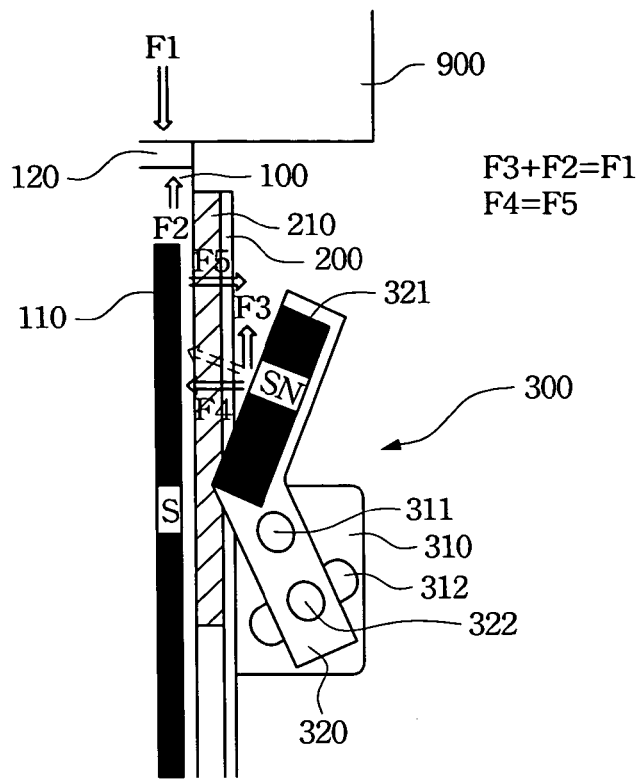
FIG. 4B is a schematic view showing the balance of forces between the magnetic object and the magnetic piece.

As shown in FIG. 4B, the magnetic object 321 with an angle to the slide 100 and the magnetic piece 110 on the slide 100 generate a magnetic repulsive force. Since the magnetic object 321 and the magnetic piece have a relative angle, the repulsive force between them has a vertical component F3 and a horizontal component F4. The horizontal component F4 balances with a horizontal repulsive force F5 from the magnetic piece 110. The vertical component F3 plus the friction F2 equals F1, which is the weight of the slide 100 with the device 900. This balance of the forces stops the slide 100 and the device 900 from sliding down.

Figure 4C:
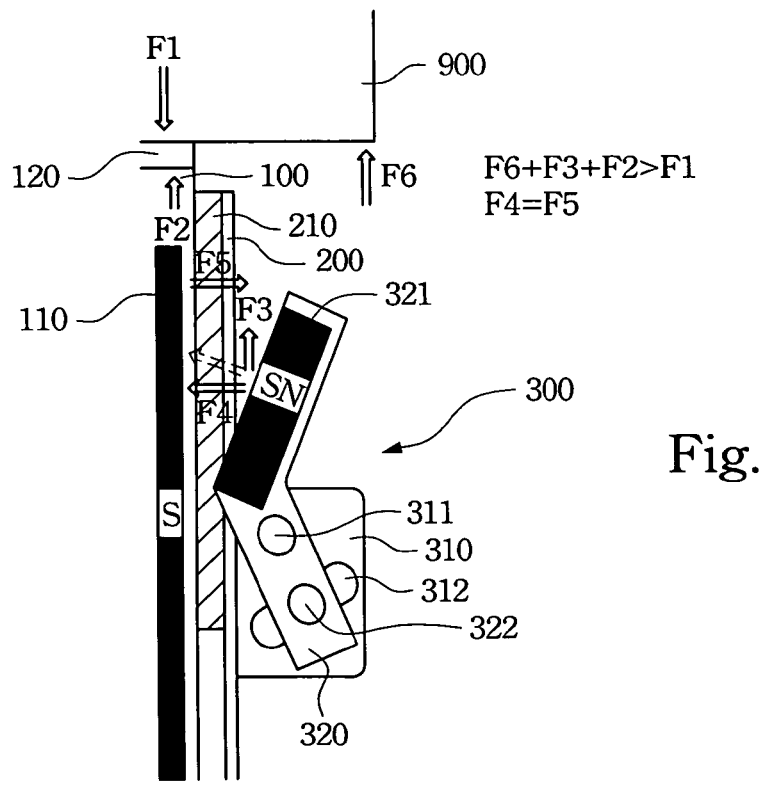
FIG. 4C is a schematic view illustrating how an external force moves the device.

As shown in FIG. 4C, an external force F6 is imposed to move the slide 100 and the device 900 upwards. The external force F6 breaks the original balance mentioned above. The slide 100 and the device 900 move upwards along the track 200 in the direction of the external force F6. Once the external force F6 is removed, the balance of the forces is achieved again. The slide 100 and the device 900 thus stop at the predetermined position. This achieves stepless altitude adjustment.

The above description only refers to the S magnetic pole of the magnetic piece 110 and the corresponding part of the magnetic repulsive mechanism 300. Since the magnetic repulsive mechanism 300 has an axial symmetry in structure, the same description applies to the N magnetic pole of the magnetic piece 110 and the other part of the magnetic repulsive mechanism 300.

In FIG. 4C, the external force F6 lifts the device 900 upwards. However, if F6 is an external force directed downwards, one has $$F3+F2<F1+F6,$$

and the device 900 is moved downwards by F6.

For adjusting devices of different weights, the angle between the magnetic object 321 and the magnetic piece 110 is adjusted by the position that the fixing device 322 is coupled to the angle-adjusting groove 312. The larger the angle between the magnetic object 321 and the magnetic piece 110 is, the larger the upward repulsive force is and the smaller the horizontal repulsive force is. This is used correspondingly for heavier devices. On the other hand, the smaller the angle between the magnetic object 321 and the magnetic piece 110 is, the smaller the upward repulsive force is and the larger the horizontal repulsive force is. This is used correspondingly for lighter devices. The user also uses a stronger magnetic object 321 for heavy devices.

Various kinds of modifications can be made to the disclosed embodiments without departing from the spirit of the invention. For example, the magnetic poles of the magnetic piece 110 and these of the magnetic object 321 are not limited to the directions shown in the drawings. The arm 320 is not restricted to only the V shape either. As long as the same effect is achieved between the magnetic object 321 and the magnetic piece 110, the arm 320 is able to be of any shape. All such variations should be included within the scope of the invention.

From the above-mentioned embodiments, one readily sees that the invention has the following advantages:

1. A magnetic repulsive force replaces the elastic force of a coil spring in the prior art to achieve the goal of stepless altitude adjustment.
2. The altitude adjustment for devices of different weights is implemented by simply adjusting the magnetic repulsive force or replacing the magnetic object.
3. The altitude adjusting mechanism is easily dissembled for replacement and maintenance of components thereof.

Although the invention has been described with reference to specific embodiments, this description is not meant to be construed in a limiting sense. Various modifications of the disclosed embodiments, as well as alternative embodiments, are apparent to persons skilled in the art. It is, therefore, contemplated that the appended claims will cover all modifications that fall within the true scope of the invention.

What is claimed is:

1. A magnetic altitude adjusting mechanism, comprising:
a slide having a bar shape and enclosing a magnetic piece, the magnetic piece being configured in the slide, a longitudinal direction of the magnetic piece and a longitudinal direction of the slide being the same;
a track coupled to the slide for the slide to move thereon without rotation; and
a magnetic repulsive mechanism disposed on one end of the track and generating a magnetic repulsive force with the magnetic piece to fix a position of the slide;
wherein the slide moves along the track once an external force is imposed on the slide, and the slide stops at a predetermined position by the magnetic repulsive force between the magnetic repulsive mechanism and the magnetic piece once the external force is removed.

2. The magnetic altitude adjusting mechanism of claim 1, wherein the magnetic repulsive mechanism comprises:
a fixing base fixing the track from both sides and comprising a fulcrum and an angle-adjusting groove; and
an arm set coupled to the fulcrum by a central portion of the arm set for oscillating around the fulcrum, each of the arms comprising:
a magnetic object disposed on one end of the arm set, magnetically repulsive to the magnetic piece; and
a fixing device disposed on the other end of the arm set and coupled to the angle-adjusting groove;
wherein the coupling position of the fixing device to the angle-adjusting groove determining the orientation of the arm set, thereby adjusting the magnetic repulsive force between the magnetic object and the magnetic piece.

3. The magnetic altitude adjusting mechanism of claim 1, wherein the magnetic piece comprises a plurality of magnetic objects and the magnetic poles of the magnetic objects are aligned along the same longitudinal direction.

4. The magnetic altitude adjusting mechanism of claim 1, wherein the track comprises a sliding piece between the track and the slide for the slide to move smoothly.

5. The magnetic altitude adjusting mechanism of claim 1, wherein the slide comprises a device-coupling base for coupling with a device and for adjusting the altitude of the device.

6. The magnetic altitude adjusting mechanism of claim 5, wherein the device comprises a thin display device.

7. The magnetic altitude adjusting mechanism of claim 1, wherein the magnetic altitude adjusting mechanism further comprises a base coupled on a bottom of the track to increase the stability thereof.

8. A magnetic altitude adjusting mechanism, at least comprising:
   a slide having a bar shape and enclosing a magnetic piece, the magnetic piece being configured in the slide and a longitudinal direction of the magnetic piece and a longitudinal direction of the slide being the same;
   a track coupled to the slide for the slide to move along the track without rotation; and
   a magnetic repulsive mechanism disposed on one end of the track and generating a magnetic repulsive force with the magnetic piece to fix the position of the slide and the magnetic repulsive mechanism comprising:
      a fixing base fixing the track from both sides and comprising a fulcrum and an angle-adjusting groove; and
      an arm set coupled to the fulcrum by the central portion of the arm set and for oscillating around the fulcrum, each arm set comprising:
         a magnetic object disposed on one end of the arm, magnetically repulsive to the magnetic piece; and
         a fixing device disposed on the other end of the arm and coupled to the angle-adjusting groove;
         wherein the coupling position of the fixing device to the angle-adjusting groove determines the orientation of the arm, thereby adjusting the magnetic repulsive force between the magnetic object and the magnetic piece;
   wherein the slide moves along the track when an external force is imposed, once the external force is removed, the slide stops at a predetermined position due to the magnetic repulsive force between the magnetic repulsive mechanism and the magnetic piece.

9. The magnetic altitude adjusting mechanism of claim 8, wherein the magnetic piece comprises a plurality of magnetic objects, and the magnetic poles of the magnetic objects are aligned along the same longitudinal direction.

10. The magnetic altitude adjusting mechanism of claim 8, wherein the track comprises a sliding piece between the track and the slide for the slide to move smoothly.

11. The magnetic altitude adjusting mechanism of claim 8, wherein the slide comprises a device-coupling base for being coupled to a device and for adjusting the altitude of the device.

12. The magnetic altitude adjusting mechanism of claim 11, wherein the device comprises a thin display device.

13. The magnetic altitude adjusting mechanism of claim 8, further comprising a base coupled on the bottom of the track to increase the stability thereof.

* * * * *